(12) United States Patent
Van Duffel et al.

(10) Patent No.: US 9,434,132 B2
(45) Date of Patent: Sep. 6, 2016

(54) MULTI-LAYERED DECORATIVE PANEL AND METHOD FOR MANUFACTURING A MULTI-LAYERED DECORATIVE PANEL

(71) Applicant: FALCO TECHNOLOGIES BVBA, Tielt-Winge (BE)

(72) Inventors: Bart Van Duffel, Tielt-Winge (BE); Antonius Wilhelmus Van Duffel, Lubbeek (BE)

(73) Assignee: FALCO TECHNOLOGIES BVBA, Tielt-Winge (BE)

( * ) Notice: Subject to any disclaimer, the term of this patent is extended or adjusted under 35 U.S.C. 154(b) by 0 days.

(21) Appl. No.: 14/430,972

(22) PCT Filed: Jun. 4, 2013

(86) PCT No.: PCT/EP2013/061520
§ 371 (c)(1),
(2) Date: Mar. 25, 2015

(87) PCT Pub. No.: WO2014/048589
PCT Pub. Date: Apr. 3, 2014

(65) Prior Publication Data
US 2015/0251381 A1    Sep. 10, 2015

(30) Foreign Application Priority Data
Sep. 25, 2012 (EP) .................... 12185943

(51) Int. Cl.
*B32B 7/12* (2006.01)
*B32B 17/10* (2006.01)
(Continued)

(52) U.S. Cl.
CPC ............... *B32B 7/12* (2013.01); *B32B 15/082* (2013.01); *B32B 15/09* (2013.01); *B32B 15/20* (2013.01);
(Continued)

(58) Field of Classification Search
CPC ....... B32B 7/12; B32B 17/064; B32B 15/20; B32B 15/082; B32B 15/09; B32B 37/16; C04B 20/10
See application file for complete search history.

(56) References Cited

U.S. PATENT DOCUMENTS

2003/0114234 A1\* 6/2003 Martin et al. .................. 472/92
2004/0234735 A1 11/2004 Reynolds et al.
(Continued)

FOREIGN PATENT DOCUMENTS

DE      3232238 A1    3/1984
DE   202010002822 U1    6/2010
(Continued)

OTHER PUBLICATIONS

Decker et al.,"UV-Curable Acrylic Resins for Production of Glass Laminates", Journal of Applied Polymer Science, vol. 55, No. 2, Jan. 10, 1995, pp. 359-369.
(Continued)

*Primary Examiner* — Betelhem Shewareged
(74) *Attorney, Agent, or Firm* — Workman Nydegger

(57) ABSTRACT

A multi-layered decorative panel comprises a digitally printed rigid panel including a digitally printed image digitally printed onto a rigid panel and at least one other rigid panel. At least one of the rigid panels is transparent with a solid adhesive layer adapted to bond the digitally printed rigid panel and the other rigid panel together. The digitally printed image faces the solid adhesive layer, and the solid adhesive layer is composed of a cured adhesive resin that is liquid at a temperature of between 20° C. and 25° C. and when being applied.

20 Claims, 1 Drawing Sheet

(51) Int. Cl.
*C03C 27/10* (2006.01)
*B41M 5/00* (2006.01)
*B44C 5/04* (2006.01)
*B44F 1/06* (2006.01)
*B32B 15/082* (2006.01)
*B32B 15/09* (2006.01)
*B32B 15/20* (2006.01)
*B32B 17/06* (2006.01)
*B32B 37/16* (2006.01)

(52) U.S. Cl.
CPC ....... *B32B 17/064* (2013.01); *B32B 17/10018* (2013.01); *B32B 17/10036* (2013.01); *B32B 17/1077* (2013.01); *B32B 17/10256* (2013.01); *B32B 17/10266* (2013.01); *B32B 17/10284* (2013.01); *B32B 17/10733* (2013.01); *B32B 17/10743* (2013.01); *B32B 17/10779* (2013.01); *B32B 17/10798* (2013.01); *B32B 17/10807* (2013.01); *B32B 37/16* (2013.01); *B41M 5/007* (2013.01); *B41M 5/0047* (2013.01); *B44C 5/0407* (2013.01); *B44F 1/066* (2013.01); *C03C 27/10* (2013.01); *B32B 2255/06* (2013.01); *B32B 2255/26* (2013.01); *B32B 2255/28* (2013.01); *B32B 2305/72* (2013.01); *B32B 2307/4023* (2013.01); *B32B 2307/75* (2013.01); *B32B 2323/00* (2013.01); *B32B 2327/06* (2013.01); *B32B 2333/04* (2013.01); *B32B 2369/00* (2013.01); *B32B 2375/00* (2013.01); *B32B 2451/00* (2013.01); *Y10T 428/24868* (2015.01); *Y10T 428/24884* (2015.01)

(56) References Cited

U.S. PATENT DOCUMENTS

| | | |
|---|---|---|
| 2006/0078716 A1 | 4/2006 | Yacovone |
| 2007/0042194 A1* | 2/2007 | Hayashi et al. ............. 428/426 |
| 2007/0126833 A1 | 6/2007 | Laurin et al. |
| 2007/0172636 A1 | 7/2007 | Smith et al. |
| 2007/0172637 A1 | 7/2007 | Hayes et al. |
| 2008/0105371 A1 | 5/2008 | Smith et al. |
| 2008/0206504 A1 | 8/2008 | Hayes et al. |

FOREIGN PATENT DOCUMENTS

| | | |
|---|---|---|
| EP | 1651434 A1 | 5/2006 |
| EP | 2030778 A1 | 3/2009 |
| EP | 2239238 A1 | 10/2010 |
| JP | 2010000788 A | 1/2010 |
| JP | 2010023488 A | 2/2010 |
| JP | 2011190133 A | 9/2011 |
| WO | 2005085371 A1 | 9/2005 |
| WO | 2006050536 A2 | 5/2006 |

OTHER PUBLICATIONS

European Search Report for corresponding European Application No. 12185943.3, Feb. 8, 2013.

International Search Report for corresponding International PCT Application No. PCT/EP2013/061520, Aug. 9, 2013.

* cited by examiner

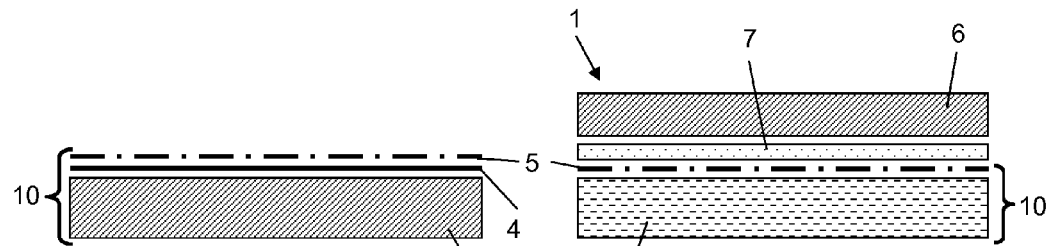
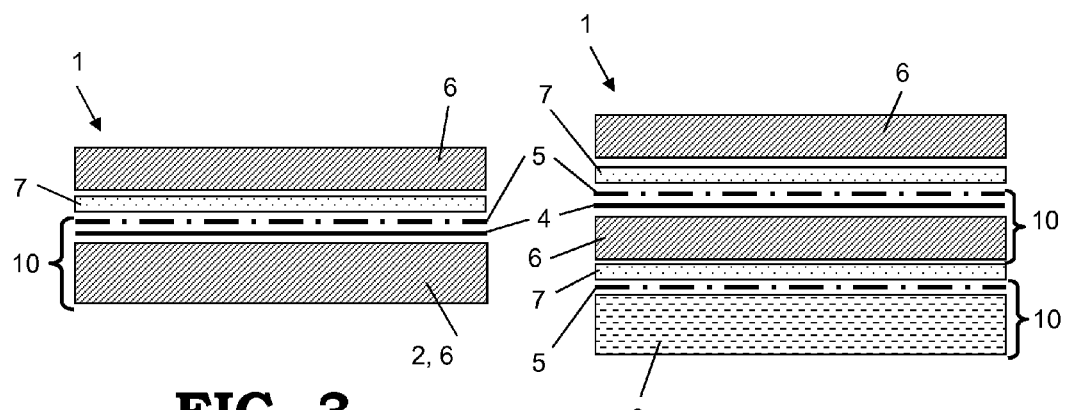
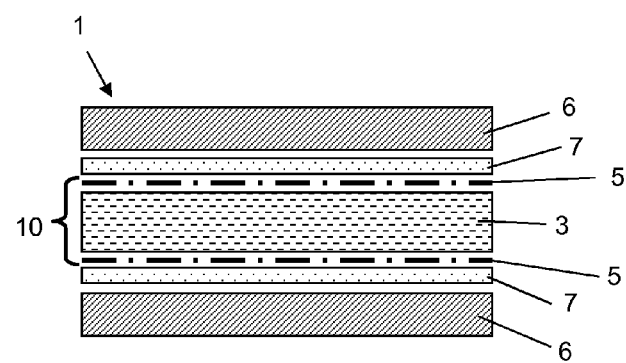

MULTI-LAYERED DECORATIVE PANEL AND METHOD FOR MANUFACTURING A MULTI-LAYERED DECORATIVE PANEL

FIELD OF THE INVENTION

The present invention relates to a multi-layered decorative panel and a method for manufacturing such a multi-layered panel.

The present invention relates more specific to a multi-layered decorative panel comprising
- a digitally printed rigid panel comprising a digitally printed image that is digitally printed onto a first rigid panel;
- at least one other rigid panel; and
- a solid adhesive layer adapted to bond said digitally printed rigid panel and said other rigid panel together.

A major advantage of using digital printing to decorate a rigid panel is that it is a very flexible and a quick means for preparing finished printed images since the required setup times is minimal to produce an image, reducing the cost and the turnaround time of a short run as compared to traditional screen printing operations. Furthermore, in contrary to more traditional printing techniques like screen printing, with digital printing no intermediate steps between the image file and the print are present. The advantage thereof is that single print jobs are economically meaningful.

Furthermore, by arranging the digitally printed image between two layers, this digitally printed image is protected from abrasion, moisture, air, chemicals and pollution.

Also, a low cost, impact proof, easy-to-clean, strong and light multi-layered decorative panel is obtained in this way.

BACKGROUND OF THE INVENTION

As living standards improve, people pay more and more attention to interior as well as exterior decoration of windows, doors and outer walls of amongst other buildings and vehicles. Society furthermore demands for new decorative and safe glass applications.

Single as well as multi-layered glass can be decorated. Multi-layering of glass sheets therewith provides an enhanced mechanical stability of the glass. Multi-layered glass sheets also allow to include decorative features between the different glass layers.

There is significant commercial interest in the fabrication of customized multi-layered glass panels with encapsulated coloured decoration for use in architectural and automotive applications.

Because of its ceramic nature, glass however is a very challenging substrate for decorating, coating and printing. Adhesion of inks to glass is very difficult because of the low contact area. In addition, many glass applications (such as in construction) require a very robust solution.

Standard organic or semi-organic inks printed on glass are not sufficiently durable for many glass applications.

One known approach to printing on glass is printing with ceramics. Since a post baking step is required in this approach to harden the inks and adhere them to the glass, disadvantages are the investment in baking equipment, extra process time and high energy costs. Further disadvantages are the investment cost in a dedicated ceramics printer and lower resolution than standard inkjet printers.

Printing of silane-containing inks is technically difficult because there are problems with blockage of print heads. This requires an intensive flushing increasing the ink cost. This furthermore requires a post heat treatment leading to investments in ovens increasing the energy costs and factory area.

In the patent literature, already several methods and approaches for manufacturing multi-layered decorative panels or decorated laminated safety glass panels have been described, circumventing or trying to solve the difficulties as described above to decorate glass.

It is commonly known to apply decorated foils between glass plates and other types of substrates. It is furthermore commonly known to apply adhesive films between glass plates and other types of substrates. Well known examples of such adhesive films are polyvinyl butyral sheet or ethylene vinyl acetate sheets.

In EP 2 030 778 for instance, a decorative laminated glass is described comprising two transparent substrates and an intermediate film including two adhesive resin films and a base film having an ink layer printed in a predetermining pattern therebetween. The intermediate film is arranged between the transparent substrates to be combined with each other.

In US 2004/0234735, a method and apparatus is described for producing an image carrying laminated material. An image is printed on a polyvinylbutyral interlayer using a solvent based ink, paint or dye system. The interlayer is used to join two sheets of material to form the laminate.

In DE 3232238, a pane of laminated glass is made of two individual panes of glass and a thermoplastic intermediate layer, the latter joined to one another A particularly decorative effect is given due to the fact that one individual pane of glass is printed with narrow stripes, arranged parallel to one another, of a printable ink on the surface joined to the thermoplastic intermediate layer.

In US 2008/0105371, a process is described for preparing a decorative glass laminate comprising a rigid thermoplastic interlayer, wherein the process comprises printing an image onto at least one of the interlayer surfaces.

In WO 2005/085371 and WO 2006/050536, the decorative laminated article comprises an image bearing thermoplastic interlayer, wherein the image has been printed on the interlayer using an inkjet printing process. The image therewith comprises a white pigment on the surface of the thermoplastic interlayer.

In EP 1 651 434, a decorative glass laminate is disclosed comprising a rigid interlayer bearing a printed image that has been printed onto at least one of the interlayer surfaces. Also a process for preparing the same is disclosed.

In DE 20 2010 002 822, a glass laminate, in particular for doors, windows, roof covers, etc. is disclosed. Therein, a top side and a lower surface of the glass laminate are formed by a windowpane. Between the upper-lateral windowpane and the under-lateral windowpane, at least partially a printable foil layer out of foil plastic is arranged. Furthermore, at least between the printable foil layer and the upper-lateral windowpane and/or between the printable foil layer and the under-lateral windowpane, a connecting foil out of a connecting plastic is arranged.

In US 2008/0206504, an image-bearing article is described comprising a rigid sheet bearing an image which is coated on the image-bearing side and over the image with an adhesion promotor. The image-bearing side of the rigid sheet can be laminated to a polymeric interlayer sheet such as a polyvinyl butyral (PVB) or ethylene vinyl acetate (EVA) sheet. To this interlayer sheet, a second rigid sheet can be laminated.

In US 2007/0172636, a decorated polymer sheet is disclosed. At least one of the surfaces of this sheet has disposed thereon an image which is applied to the sheet by a digital printing process. Furthermore, at least this surface has disposed therein an adhesive composition that is used to enhance the bond strength between the image disposed on the polymer sheet and other materials, particularly to another layer in a laminate structure. At least a portion of this adhesive composition is therewith in contact with the image. This decorated polymer sheet can be incorporated in a laminate having at least one additional layer. This additional layer will generally and preferably be in contact with a surface of the decorated polymer sheet upon which the image and the adhesive composition are disposed.

In JP 2011190133, a decorative laminated glass is disclosed in which at least two glass plates are laminated with a resin interlayer film. At least one of the glass plates carries a pattern layer inkjet-printed with an ultraviolet-curable resin ink. A primer layer is provided between the pattern layer and the glass plate. An adhesive layer consisting of a polyvinyl acetal resin or a polyvinyl butyral resin is provided between the pattern layer and the resin interlayer film.

In EP 2 030 778, a decorative laminated glass is disclosed comprising two transparent substrates and an intermediate film including two adhesive resin films and a base film having an ink layer printed in a predetermining pattern therebetween. The intermediate film is arranged between the transparent substrates to be combined with each other. The base film is subjected to an adhesion-facilitating treatment. The adhesive film comprises an ethylene vinyl acetate copolymer.

The disadvantage of printing of foil and lamination using adhesive films requires a large investment in pressing and heating (autoclave) equipment and low-dust environment.

The disadvantage of PVB adhesive films is that PVB is moisture sensitive.

EVA adhesive films have the disadvantage that these are difficult to handle because of sticking/tackiness. EVA usually contains 33% of vinyl acetate; this being a very soft and tacky substance that tends to stick to itself. This tackiness makes handling of the EVA-material in a manufacturing environment much more troublesome.

A further disadvantage is that foil lamination of tempered glass with a print is difficult since foil lamination requires very flat glass and tempered can have a curvature of several millimeters.

Other lamination solutions using coatings require a complex and time-consuming process (drying and heat treatment).

There is consequently a desire to obtain a multi-layered decorative panel
- having a high quality;
- being safe;
- without the need of a complex production process, for instance without the need of an additional baking treatment, i.e. on high temperatures above 100° C.;
- without the need of additional solvent-based coatings that consume time to dry;
- without the need of large investments in equipment or a (dust and moisture) controlled environment;
- without the need of a large factory area for printing and lamination processes; and
- having the possibility to apply many types of (digitally printed) rigid panels.

SUMMARY OF THE INVENTION

According to a first aspect of the invention, a multi-layered decorative panel is provided comprising

- a digitally printed rigid panel comprising a digitally printed image that is digitally printed onto a first rigid panel;
- at least one other rigid panel;
- at least one of said rigid panels being transparent;
- a solid adhesive layer adapted to bond said digitally printed rigid panel and said other rigid panel together;

wherein said digital print faces said solid adhesive layer, and wherein said solid adhesive layer is composed of a cured adhesive resin that is liquid at a temperature of between 20° C. and 25° C. and when being applied.

The term 'rigid panel' is used to indicate not to be a foil.

The term 'liquid' is used for a substance that flows freely but is of constant volume.

The term 'liquid adhesive resin' means a liquid synthetic organic polymer used as the basis of an adhesive.

The advantage of using a liquid adhesive resin is that a low start-up cost is necessary and it achieves safety performances similar to layers that are laminated to each other using foils such as EVA or PVB. In additions, adhesive resins can be formulated to achieve other characteristics such as a superior adhesion, water resistance, UV-absorption (filter), pigmentation.

In a preferred embodiment of a multi-layered decorative panel according to the invention, said liquid adhesive resin has a viscosity of between 0.1 cP and 20,000 cP, more preferably of between 0.25 cP and 10,000 cP.

Said liquid adhesive resin can be
- curable at a temperature of between 20° C. and 25° C.;
- curable at a temperature elevated above 25° C.;
- electron beam curable;
- chemically curable; and/or
- ultraviolet (UV) curable.

In an advantageous embodiment of a multi-layered decorative panel according to the invention, said adhesive resin is chosen from a one or more multiple component acrylate-type, polyester-type, epoxy-type, polyurethane-type adhesive resin and/or combinations thereof.

Examples of liquid adhesive resins that are usable for the adhesive layer are UV-curable urethane-acrylate liquid adhesive resins, two-component styrene containing or styrene free polyester liquid adhesive resins, two-component styrene containing or styrene free polyurethane liquid adhesive resins, two-component heatable polyurethane liquid adhesive resins, cellulose-ester liquid adhesive resins and/or combinations thereof.

In a possible embodiment of a multi-layered decorative panel according to the invention, said digitally printed rigid panel comprises a rigid panel that is composed of an acrylic or polycarbonate compound and that is directly digitally printed with said digital print.

With 'directly printed' is meant that no extra coating layer has to be applied in order to print the panel. Low energy plastics such as polyethylene and polypropylene however need a standard pre-treatment, typically a corona-treatment, in order to raise the surface energy of the panel. Because the adhesion of inks onto these panels is generally better in comparison to glass, less or no adsorption competition occurs with the adhesive causing no distortion of the digital print during the bonding step when an adhesive layer is applied on this digitally printed image.

A problem that occurs with directly digitally printed glass is that, when applying a liquid resin adhesive on this digitally printed image—which is a very attractive approach to obtain a multi-layered decorative panel since a very strong multi-layered decorative panel is obtained and the use of low energy curing methods is possible—the molecular constituents of the adhesive layer will compete with the ink polymer for adsorption on the glass surface and they will also wet the cured ink droplets. In other words this digitally printed layer is not compatible with these liquid resin adhesives. As a result, the ink droplets of the printed layer will debond from the glass surface before and during the curing process thereof. At that moment, the adhesive layer undesirably acts as a cleaning solvent. This process is called chemical debonding, resulting in a distortion of the digitally printed image.

This problem for instance can occur with the system for manufacturing laminated artistic stained glass as disclosed in ES 2050610. Therein, a system based on glass panes which have, on one of their surfaces, drawings printed by any process. On the drawing-bearing surface side of the glass pane is placed a second pane of glass, which is transparent, of the same size, and which bears no drawing. The two panes are placed in a mutually close and parallel position, with the perimeters coinciding. The space limited between the two panes is sealed peripherally to form a sealed chamber which is filled with a solidifiable liquid adhesive of a transparent type. The stained glass obtained is composed of a stratified structure formed by two outer panes of glass and an intermediate layer of a solidified, transparent adherent substance.

Also aluminium surfaces suffer with this problem.

This problem is solved by providing a multi-layered decorative panel according to the invention, said digitally printed rigid panel comprising
- a glass panel, an aluminium or aluminium composite panel having an outer aluminium surface, and
- a primer layer applied between said glass panel, aluminium or aluminium composite panel having an outer aluminium surface and said digitally printed image.

An aluminium composite panel is typically a rigid panel consisting of two thin aluminium sheets bonded by a non-aluminium core. The core can be polyethylene or polypropylene. The outer aluminium surface can be non-coated, anodised or coated with a polyester or acrylic coating. When an organic coating is applied onto the aluminium surface, this coating can act as a primer for UV inkjet prints and no further primer layer has to be applied.

The primer layer is therewith specifically selected as to bond to the glass or the aluminium surface by means of both polar physical and chemical bonds and also to the ink of the digitally printed image. The primer layer consequently is an adhesion promoting layer enhancing the adhesion between the digitally printed image and the glass or aluminium surface. This primer layer is thus used to achieve a sufficient bonding strength between the image bearing surface of the digitally printed rigid panel, the digitally printed image and the other rigid panels. In addition, it is used to avoid chemical debonding during the lamination process of the liquid adhesive resin. The adhesive liquid resin acts as a debonding solvent and 'dissolves' the image during the lamination process if no primer layer is applied.

In this way, a fast and easy solution is obtained to digitally print on glass and aluminium surfaces using standard digital printing equipment.

In a possible embodiment of a multi-layered decorative panel according to the invention, said primer layer consists of a molecular thin film primer layer or a primer coating layer.

Said primer coating layer can consist of an organic coating layer or a hybrid organic-inorganic coating layer.

Said primer coating layer preferably has a thickness of less than 50 µm, preferably less than 10 µm.

Said molecular thin film primer layer preferably has a thickness of less than 0.1 µm, more preferably less than 0.01 µm.

In an advantageous embodiment of a multi-layered decorative panel according to the invention, said primer layer is silane based.

Preferably, said silane based primer layer is composed of a radical polymerisable silane or a silane with a radical polymerisable functional group.

Examples of silane based primers are selected from the group consisting of methacryloxypropyl trimethoxysilane, acryloxypropyl trimethoxysilane, methacryloxypropyltris(trimethylsiloxy)silane, methacryloxypropyl triethoxysilane, acryloxypropyltriethoxysilane, methacryloxypropyltriisopropoxysilane, 2-(3,4-epoxycyclohexyl)ethyltrimethoxysilane, 5,6-epoxyhexyl trimethoxysilane, 5,6-epoxytriethoxysilane, (3-Glycidoxypropyl)methyldiethoxysilane, (3 Glycidoxypropyl)methyldimethoxysilane, (3-Glycidoxypropyl)dimethylethoxysilane, (3-Glycidoxypropyl)bis(trimethylsiloxy)methylsilane, (3-Glycidoxypropyl)trimethoxysilane and/or mixtures thereof.

In a preferred embodiment of a multi-layered decorative panel according to the invention, said digitally printed image is composed of an ultraviolet (UV) curable or thermocurable ink, or an ink that is sinterable by means of a Xenon-flash lamp or a laser.

UV-curable ink has the advantage that it essentially does not contain any solvent that otherwise must evaporate during the curing phase thereof.

In an advantageous embodiment of a multi-layered decorative panel according to the invention, said digitally printed image is composed of a function ink comprising an electrical conductive ink, an insulating or semi-conductive ink and/or a luminous (light emitting) ink.

These functional inks possibly are UV-curable, but are not limited thereto.

Said multi-layered decorative panel according to the invention can furthermore comprise one or more further rigid panels and/or one or more digitally printed rigid panels being bonded to said digitally printed rigid panel(s) and/or said further rigid panel(s) by means of said adhesive layer that is composed of a cured adhesive resin that is liquid at a temperature of between 20° C. and 25° C. and when being applied.

According to a second aspect of the invention, a method for manufacturing a multi-layered decorative panel according to the invention as disclosed above is described, wherein said method at least comprises the steps of
- providing a digitally printed substrate by applying a digitally printed image onto a first rigid panel;
- providing an other rigid panel and registering said other rigid panel with said digitally printed rigid panel, said digitally printed image being directed towards the inner side of said decorative panel;
- at least one of said rigid panels being transparent;
- applying said liquid adhesive resin between said registered other rigid panel and
- said digitally printed rigid panel; and
- curing said liquid adhesive resin until a solid adhesive layer is obtained.

BRIEF DESCRIPTION OF THE DRAWINGS

FIG. 1 illustrates a schematic exploded view of a digitally printed glass panel which is pre-treated with a primer layer before being digitally printed;

FIG. 2 illustrates a schematic exploded view of a multi-layered decorative panel according to the invention, consisting of a direct digitally printed rigid panel, an upper outer transparent glass panel and an adhesive resin layer between said digitally printed rigid panel and said upper outer transparent glass panel;

FIG. 3 illustrates a schematic exploded view of a multi-layered decorative panel according to the invention, consisting of a lower outer digitally printed glass panel being pre-treated with a primer layer before being digitally printed, an upper outer transparent glass panel and an adhesive resin layer between the top of the outer digitally printed rigid panel and the back of the upper outer transparent glass panel;

FIG. 4 illustrates a schematic exploded view of a multi-layered decorative panel according to the invention, consisting of an outer lower direct digitally printed rigid panel, an intermediate digitally printed glass panel being pre-treated with a primer layer before being digitally printed and an outer upper glass panel, an adhesive resin layer between the top of the outer lower digitally printed rigid panel and the back of the intermediate digitally printed glass panel and an adhesive resin layer between the top of this intermediate digitally printed glass panel and the back of the outer upper glass panel; and FIG. 5 illustrates a schematic exploded view of a multi-layered decorative panel according to the invention consisting of an outer lower glass panel, an intermediate rigid panel directly digitally printed at the top as well as at the back thereof, an outer upper glass panel, an adhesive resin layer between the back of the upper glass panel and the top of the direct digitally printed rigid panel and the back of the direct digitally printed rigid panel and the top of the outer lower glass panel.

DETAILED DESCRIPTION OF EMBODIMENT(S)

A multi-layered decorative panel (1) according to the invention comprises
- a digitally printed rigid panel (10) comprising a digitally printed image (5) that is digitally printed onto a first rigid panel (2, 3, 6);
- at least one other rigid panel (2, 3, 6);

wherein at least one of these rigid panels (3, 6) are transparent.

The multi-layered decorative panel (1) furthermore comprises a solid adhesive layer (7) that bonds the digitally printed rigid panel (10) and the other rigid panel (2, 3, 6) together. The digitally printed image (5) faces the solid adhesive layer (7).

Rigid Panels

A first rigid panel (2, 3, 6) bears the digitally printed image. This digitally printed rigid panel (10) can be manufactured out of glass, an acrylic compound, a polycarbonate compound, aluminium or an aluminium composite having an outer surface of aluminium, whereupon a digitally printed image (5) is applied. An example of an acrylic compound is polymethylmethacrylate (PMMA or plexiglass) The glass, acrylic compound, polycarbonate compound rigid panel (3, 6) to be printed upon can be transparent as well as non-transparent. An aluminium composite for instance is a polyethylene aluminium sandwich panel such as Dibond, Reynobond, E-bond, etc.

The at least one other rigid panel (2, 3, 6) can also be manufactured out of glass, an acrylic compound, a polycarbonate compound, aluminium or aluminium composite.

The thickness of the rigid panels (2, 3, 6) is not critical and may be varied depending on the particular application. Generally, the thickness of the rigid panels (2, 3, 6) are as follows:

| Material of rigid panel | Thickness | Preferred thickness |
|---|---|---|
| Glass | 1-50 mm | 1-20 mm |
| Aluminium (inclusive aluminium composite) | 0.2-10 mm | Aluminium: 0.2-3 mm<br>Aluminium composite: 2-6 mm |
| Polycarbonate (PC) compound | 1-20 mm | 1-20 mm |
| Acrylic compound | 1-20 mm | 1-20 mm |

Adhesive Resin Layer

The solid adhesive layer (7) originates from an adhesive resin that is liquid at a temperature of between 20° C. and 25° C. which is cured. This curing can occur
- at a temperature of between 20° C. and 25° C.;
- at a temperature elevated above 25° C.;
- by means of an electron beam;
- by means of chemical curing; or
- by means of UV-curing.

The liquid adhesive resin preferably has a viscosity of between 0.1 and 20,000 cP, preferably of between 0.25 and 10,000 cP (or mPa·s) at a temperature of between 20° C. and 25° C.

The adhesive resin is chosen from a one or multiple component acrylate-type, polyester-type, epoxy-type, polyurethane-type adhesive resin and/or combinations thereof.

The adhesive resin for instance can be an UV-curable acrylic-PU resin having a viscosity of 7-75-200 cP at 25° C., a polyester resin having a viscosity of 115-155 cP at 23° C. and a gel time of 89-121 minutes at 20° C., a two-component polyurethane resin, a resin containing a styrene monomer, etc.

The thickness of the solid adhesive layer (7) is not critical and may be varied depending on the particular application. Generally, the thickness of this solid adhesive layer (7) is 0.25-100 mm, more preferably 0.4-2 mm.

It is remarked that properties of adhesive resins can be enhanced by means of additives such as ultraviolet radiation absorbers, pigments, bubble evacuating additives and/or others.

Primer Layer

If this first rigid panel (2, 6) is manufactured out of glass or aluminium or is an aluminium composite having an outer aluminium surface, the surface of those rigid panels (2, 6) needs to be pretreated with a primer layer (4) on the side onto which the image will be digitally printed. Before being pretreated with the primer layer (4), the glass, aluminium or aluminium composite rigid panel (2, 6) preferably is cleaned.

This primer layer (4) can consist of a molecular thin film primer layer or a primer coating layer.

This primer coating layer can be an organic coating layer or a hybrid organic-inorganic coating layer. With a hybrid organic-inorganic coating layer is meant a coating layer that is composed of both organic constituents and inorganic constituents. Examples of organic constituents are polyacrylate or polyester polymers. Examples of inorganic constituents may be silanes or metal-organic compounds. This primer coating layer typically has a thickness of less than 50 µm, more preferably less than 10 µm.

The molecular thin film primer layer can be a monomolecular or multimolecular thin film primer layer having a thickness of less than 0.1 µm, preferably of less than 0.01 µm.

The primer layer (4) can be composed of one or more silanes, organic coatings or solgel (hybrid) coatings.

An example of a primer layer (4) comprises one or more silanes out of the following non-limitative list: methacryloxypropyl trimethoxysilane, acryloxypropyl trimethoxysilane, methacryloxypropyltris(trimethylsiloxy)silane, methacryloxypropyl triethoxysilane, acryloxypropyltriethoxysilane, methacryloxypropyltriisopropoxysilane, 2-(3,4-epoxycyclohexyl)ethyltrimethoxysilane, 5,6-epoxyhexyl trimethoxysilane, 5,6-epoxytriethoxysilane, (3-Glycidoxypropyl)methyldiethoxysilane, (3-Glycidoxypropyl)methyldimethoxysilane, (3-Glycidoxypropyl)dimethylethoxysilane, (3-Glycidoxypropyl)bis(trimethylsiloxy)methylsilane, (3-Glycidoxypropyl)trimethoxysilane and/or mixtures thereof.

A silane based primer layer (4) preferably is prehydrolised before being applied.

An example of a solgel-coating is a hybrid UV-curable epoxycoating.

The primer layer preferably is composed of an methacryloxypropyltrimethoxysilane.

Also the primer layer (4) can be UV-curable.

Digitally Printed Image

The digitally printed image (5) consists out of coloured image (including black and white) printed thereon. This digitally printed image is composed of an ultraviolet (UV) curable or thermocurable ink, or an ink that is sinterable by means of a Xenon-flash lamp or a laser. As used herein, an image can be a photograph, a logo, a symbol, a geometric pattern, alphanumeric characters or combinations thereof. The term "colour" includes all colours as well as black and white.

The image is applied by means of a digital printing technology on a face of a rigid panel (2, 3, 6).

Said digitally printed image (5) can be composed of a functional ink comprising an electrical conductive ink, an insulating or semi-conductive ink and/or a luminous ink.

Multi-Stack Decorative Panel

A multi-stack decorative panel (1) according to the invention can comprise any number more than two rigid panels (2, 3, 6, 10) and can consist out of any desired possible combination of
  one or more digitally printed rigid panels (10), either comprising a first rigid panel (3) composed of an acrylic or PC compound which can be directly printed upon, probably pre-treated with a necessary standard pre-treatment not being an extra coating layer, either comprising a glass or aluminium (composite) panel (2, 6) which has to be pre-treated with an extra primer (4) before applying the digitally printed image (5) upon, and
  one or more other rigid panels (2, 3, 6) composed of (transparent or non-transparent) an acrylic or PC compound and/or glass, or aluminium or aluminium composite,
on the condition that at least one of the rigid panels (3, 6) are transparent.

Lamination Method

The process of the lamination with the liquid adhesive resin as mentioned above consists of the following four steps:

1. On all four edges of one of the rigid panels (2, 3, 6 or 10), a double sided tape is applied. The thickness of the tape is typically between 0.4-3 mm, depending on the type of final application. Sealing of non-closed areas between the tapes can be done by means of a crossover of the tape, by sealing the non-closed areas with a non-acidic silicone or with a hot melt glue/adhesive.
2. The other of the rigid panels (2, 3, 6, 10) is put down onto the applied tape and well aligned with the abovementioned rigid panel (2, 3, 6 or 10).
3. From a part of the tape the liner/backing is removed and is firmly pressed down so as to seal the contact between the rigid panels (2, 3, 6, 10) and the tape. The thickness of the tape defines the space between the rigid panels (2, 3, 6 or 10).
4. The liquid adhesive resin is pumped or poured between the rigid panels (2, 3, 6, 10) via the in point 3 mentioned open side between the rigid panels rigid panels (2, 3, 6, 10). This open side has not been sealed yet. After the adhesive resin has been poured in the internal space between the rigid panels rigid panels (2, 3, 6, 10), the air is evacuated by laying the formed multi-layered decorative panel (1) horizontal and allowing the liquid adhesive resin to spread and fill the internal space. At the same time, the remaining liner/backing of the tape is removed and the interspace is sealed. Final trapped air and bubbles are removable using a syringe.

Production Method

The method according to the invention for manufacturing a multi-layered decorative panel (1) according to the invention comprises at least the steps of
  providing a digitally printed rigid panel (10) by applying a digitally printed image (5) onto a first rigid panel (2, 3, 6);
  providing another rigid panel (2, 3, 6) and registering the other rigid panel (2, 3, 6) with the digitally printed rigid panel (10), the digitally printed image (5) being directed towards the inner side of the decorative panel (1);
wherein at least one of the rigid panels (2, 3, 6) is transparent;
  applying the liquid adhesive resin between the registered other rigid panel (2, 3, 6) and the digitally printed rigid panel (10) using the lamination process as mentioned above; and
  curing the liquid adhesive resin until a solid adhesive layer (7) is obtained.

This method will take care that the digitally printed rigid panel (10) and the other rigid panel (2, 3, 6) are bonded together.

When the rigid panel (2, 6) to be printed upon has a glass or aluminium surface, an extra step is performed, i.e. before applying the digitally printed image (5), the rigid panel (2, 6) is pretreated with an above described primer layer (4).

Deposition of a fluid primer layer (4) can be performed using any known deposition methods for deposition of fluid coatings such as spraying, plasma deposition such as vacuum or atmospheric plasma deposition, dip coating, roll coating or curtain coating.

For each rigid panel (2, 3, 6, 10) to be added to form a multi-stack (1) comprising more than two rigid panels (2, 3, 6, 10), the steps as described above are repeated until the desired multi-stack (1) is obtained. In other words, two rigid panels (2, 3, 6, 10) are glued together by means of the method as described above, whereafter a next rigid panel (2, 3, 6, 10) is bonded to the rigid panels (2, 3, 6, 10) already bonded together also using this method.

If different rigid panels (2, 3, 6) of such a multi-stack decorative panel (1) have to be provided with a digitally printed image (5), then first two rigid panels (2, 3, 6) are glued together by means of the method as described above and subsequently a digitally printed image (5) is applied to the appropriate side thereof, whereafter a further rigid panel (2, 3, 6, 10) is glued to the two rigid panels (2, 3, 6) already glued together, this also by means of the method as described above. Further rigid panels (2, 3, 6, 10) are attached in the same way.

EXAMPLES

In FIG. 1, a digitally printed rigid panel (10) is shown consisting of
- a (transparent or non-transparent) glass panel (6) or an aluminium (composite) rigid panel (2),
- a digitally printed image (5); and
- a primer layer (4) applied between the glass or aluminium (composite) riged panel (6) and the digitally printed image (5).

In FIG. 2, a multi-layered decorative panel (1) according to the invention is shown, consisting of
- a digitally printed rigid panel (10) consisting of
  - a transparent or non-transparent outer lower rigid panel (3) composed out of a polycarbonate (PC) or acrylic compound;
  - a digitally printed image (5) printed directly on the rigid panel (3);
- an outer upper glass panel (6) which is transparent if the outer lower rigid panel (3) is non-transparent and vice versa; and
- a solid adhesive layer (7) between the outer lower digitally printed rigid panel (10) and the outer upper glass panel (6).

In FIG. 3, a multi-layered panel (1) according to the invention is shown, consisting of
- an outer lower digitally printed substrate (10) as shown in FIG. 1;
- an outer upper glass panel (6) which is transparent if the outer lower digitally
- printed substrate (10) is non-transparent and vice versa; and
- a solid adhesive layer (7) between the lower digitally printed rigid panel (10) and the outer upper glass panel (6).

In FIG. 4, an example of a three-layered multi-stack panel (1) is shown consisting of
- an outer lower digitally printed rigid panel (10) consisting of
  - a transparent or non-transparent outer lower rigid panel (3) composed out of a polycarbonate (PC) or acrylic compound;
  - a digitally printed image (5) printed directly on the outer lower rigid panel (3);
- an intermediate digitally printed rigid panel (10) as shown in FIG. 1;
- an outer upper glass transparent or non-transparent panel (6); and
- an adhesive layer (7) between
  - the outer lower digitally printed rigid panel (10) and the intermediate digitally printed rigid panel (10); and
  - the intermediate digitally printed rigid panel (10) and the outer upper glass panel (6).

In FIG. 5, another example of a three-layered multi-stack panel (1) is shown consisting of
- a transparent or non-transparent outer lower glass panel (6);
- an intermediate digitally printed rigid panel (10) consisting of
  - a transparent or non-transparent outer lower rigid panel (3) composed out of a polycarbonate (PC) or acrylic compound;
  - on the back as well as the front of this rigid panel (3), a directly printed digitally printed image (5);
- a transparent or non-transparent outer upper glass panel (6); and
- a solid adhesive layer (7) between
  - the intermediate digitally printed rigid panel (10) and the outer lower glass panel (6); and
  - the intermediate digitally printed rigid panel (10) and the outer upper glass panel (6).

The glass panel (6) and the PC or acrylic compound rigid panel (3) can be transparent or non-transparent up to the choice of the producer of the multi-layered decorative panel (1).

It is remarked that the present invention is not restricted to the examples as mentioned above. Many other combinations are possible up to the choice of the producer of the multi-layered decorative panel(s) (1).

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for manufacturing a multi-layered decorative panel, said method at least comprising the steps of:
   providing a digitally printed substrate by applying a digitally printed image onto a first rigid panel;
   providing a second rigid panel and registering said second rigid panel with said digitally printed rigid panel, said digitally printed image being directed towards an inner side of said decorative panel, wherein at least one of said first rigid panel or said second rigid panel is transparent;
   applying a liquid adhesive resin between said second rigid panel and said digitally printed rigid panel; and curing said liquid adhesive resin until a solid adhesive layer is obtained.

2. The method according to claim 1, wherein said liquid adhesive resin is liquid at a temperature of between 20° C. and 25° C. and when being applied.

3. The method according to claim 1, wherein said liquid adhesive resin has a viscosity of between 0.1 cP and 20,000 cP.

4. The method according to claim 1, wherein said liquid adhesive resin has a viscosity of between 0.25 cP and 10,000 cP.

5. The method according to claim 1, wherein said liquid adhesive resin is curable at a temperature of between 20° C. and 25° C.

6. The method according to claim 1, wherein said liquid adhesive resin is curable at a temperature elevated above 25° C.

7. The method according to claim 1, wherein said liquid adhesive resin is electron beam curable;

chemically curable; and/or ultraviolet curable.

8. The method according to claim 1, wherein said adhesive resin is chosen from a one or multiple component acrylate-type, polyester-type, epoxy-type, polyurethane-type adhesive resin and/or combinations thereof.

9. The method according to claim 1, wherein said digitally printed substrate comprises a rigid panel that is composed of an acrylic or polycarbonate compound and that is directly digitally printed with said digitally printed image.

10. The method according to claim 1, wherein said digitally printed substrate comprises a glass panel, an aluminium or aluminium composite panel.

11. The method according to claim 10, further comprising applying a primer layer between said glass panel, aluminium or aluminium composite panel and said digitally printed image.

12. The method according to claim 11, wherein said primer layer consists of a molecular thin film primer layer or a primer coating layer.

13. The method according to claim 12, wherein said primer coating layer or said molecular thin film primer layer consists of an organic coating layer or a hybrid organic-inorganic coating layer.

14. The method according to claim 12, wherein said primer coating layer has a thickness of less than 50 μm.

15. The method according to claim 12, wherein said molecular thin film primer layer has a thickness of less than 0.1 μm.

16. The method according to claim 11, wherein said primer layer is silane based.

17. The method according to claim 16, wherein said silane based primer layer comprises a radical polymerisable silane or a silane with a radical polymerisable functional group.

18. The method according to claim 1, wherein said digitally printed image comprises an ultraviolet curable or thermo curable ink, or an ink that can be sintered by means of a Xenon-flash lamp or a laser.

19. The method according to claim 1, wherein said digitally printed image comprises a functional ink comprising an electrical conductive ink, an insulating or semi-conductive ink and/or a luminous ink.

20. The method according to claim 1, further comprising providing one or more further rigid panels and/or one or more further digitally printed substrate being bonded to said digitally printed rigid panel and/or said other rigid panel by means of said adhesive layer that is composed of a cured adhesive resin that is liquid at a temperature of between 20° C. and 25° C. and when being applied.

* * * * *